United States Patent [19]

Griffin

[11] 4,143,665
[45] Mar. 13, 1979

[54] MACHINE FOR SHELLING BEANS OR PEAS AND FOR SEPARATING PARTICLES THEREFROM

[76] Inventor: Lee E. Griffin, Rte. 3, Box 252 BA, Littleton, N.C. 27850

[21] Appl. No.: 761,004

[22] Filed: Jan. 21, 1977

[51] Int. Cl.[2] .......................................... A01D 45/24
[52] U.S. Cl. ................................. 130/30 H; 209/45; 209/693
[58] Field of Search ...................... 56/14.5, 14.6, 13.5; 130/30 R, 30 H; 209/45, 84, 114, 58-63

[56] References Cited

U.S. PATENT DOCUMENTS

| | | | |
|---|---|---|---|
| 738,145 | 9/1903 | Albaugh | 130/30 H |
| 1,323,877 | 12/1919 | Lee et al. | 209/114 |
| 2,597,673 | 5/1952 | Ritter et al. | 130/30 H |
| 2,664,197 | 12/1953 | Pfister | 209/45 |
| 3,727,755 | 4/1973 | Cristiani | 209/45 |
| 3,782,545 | 1/1974 | Rayner | 209/114 |
| 3,799,338 | 3/1974 | Duda, Jr. | 209/114 |

*Primary Examiner*—Russell R. Kinsey
*Attorney, Agent, or Firm*—Fleit & Jacobson

[57] ABSTRACT

Shelling apparatus for shelling beans, peas, or other legumes, comprises a shelling bin for shelling legumes comprising a wire mesh basket having a cylindrically shaped wire mesh wall with a closed side at one end and an open side at the other end, wherein the open side is adapted to receive the legumes to be shelled from the receiving chute. One wall segment of the cylindrically shaped wire mesh basket comprises a bin door having a length substantially equal to the length of the basket and is hinged to the wall of the cylindrical basket. Longitudinally extending within the basket is a beater comprising a longitudinal shaft rotatable within the basket with a plurality of beaters extending radially from the longitudinal bar along the length of the bar. Situated underneath the basket is transverse conveyor which is designed to remove the trash and shells to a trash removal conveyor. A separating apparatus is provided and comprises a pair of conveyor belts, one situated above the other and each inclined at a different angle from the horizontal. Positioned adjacent the uppermost conveyor and at an end thereof, is a rotatable separating drum having a cylindrical shape. A rotatable brush is positioned adjacent the drum to remove the stems or other particles from the surface of the cylinder. The second conveyor belt positioned under the first conveyor belt is adapted to move smaller articles such as peas directly into a container without the imposition of the separating drum.

11 Claims, 10 Drawing Figures

MACHINE FOR SHELLING BEANS OR PEAS AND FOR SEPARATING PARTICLES THEREFROM

BACKGROUND AND SUMMARY OF THE INVENTION

A bean and pea shelling apparatus, wherein the beans are removed from their shells in a rotatable drum are known in the prior art. These prior art shellers have a beating system comprising a rotatable bar having angularly shaped beaters extending therefrom. Other prior art shelling apparatus provides for removing the shells and hulls from an end or side portion of the cylinder during the shelling operation.

It is an object of this invention to provide a bean and pea shelling apparatus that shells or hulls legumes, such as beans, butter beans, or peas in an economical, and efficient manner that minimizes waste. It is further an object of this invention to provide a bean and pea shelling apparatus that provides for a fully automatic system that automatically removes the shells or hulls for disposal.

In particular, it is an object of this invention to provide a bean or pea sheller having a cylindrically-shaped rotating basket with a removable surrounding coaxial casing. The apparatus can be used without the casing for shelling butter beans or other beans having a relatively large shell or hull, and can be used with the casing when shelling peas or other similar legumes having relatively small shells.

Still further, it is an object of this invention to provide a bean or pea sheller having a cylindrically-shaped rotating basket with a coaxial, removable, surrounding casing along with a motor-driven door that can be automatically opened following the hulling operation for removal of hulls or other wastage.

Yet another object of this invention is to provide a bean or pea sheller having a plurality of cleaning apparatus for cleaning and removing stems, bits of hulls or shells, and other undesirable particles from the beans or peas following the shelling operation, resulting in an extremely clean product with few undesirable by-products.

Another object of this invention is to provide a double-belt conveyor cleaning or separating system useful for cleaning and removing stems and other small particles.

It is still another object of this invention to provide a bean or pea sheller having a cylindrically-shaped rotary basket with a longitudinal beater shaft having plastic coated radial beaters, such as Teflon coated, to remove the beans or peas from their hulls without bruising or otherwise damaging the beans or peas.

These and other objects of the invention, as well as many of the attendant advantages thereof, will become more readily apparent when reference is made to the following description, taken into conjunction with the accompanying drawings.

DETAILED DESCRIPTION OF THE DRAWINGS

The invention relates to an apparatus for shelling or hulling beans or peas, such as butter beans, or other legumes. The invention comprises a shelling apparatus 1 for shelling the legumes and then removing the shells of the legumes therefrom, and a separating apparatus 3 designed to separate the legumes from undesirable bits and pieces of shells, hulls or stems, etc. The shelling apparatus 1 includes a housing or frame 2 that supports the various components of the shelling apparatus. The separating apparatus 3 includes a support frame 4 for supporting the various components of the separating apparatus. The beans or peas to be shelled are deposited into a receiving chute 5 where they are gravity fed into a shelling bin 7. A hopper conveyor 9 can be used to convey the beans or peas to be shelled into the receiving chute. The shelling bin is a cylindrical shaped wire mesh basket 11, wherein one segment of the cylindrically shaped wall of the basket comprises a door 13 that can be opened and closed during the operation. Located along the axis of the bin is a longitudinal shaft 15 having radial beaters 17 which, when rotated separate the beans or peas from their shells. A transverse conveyor 19 is positioned below the shelling bin and moves in a direction transverse to the major axis of the bin. The transverse conveyor 19 is adapted to transport product in an angularly upward direction. The beans or peas fall through the wire mesh basket onto the transverse conveyor. The beans or peas roll down the transverse conveyor in a direction opposite to the direction of motion of the transverse conveyor, as shown in the schematic FIG. 6, whereas any scraps or shells that happen to fall through the wire mesh basket are carried by the transverse conveyor upward. The beans or peas roll down onto a product conveyor 21 where they are conveyed to the separating appatatus 3. The bits of shells or hulls that fall through the basket are carried upward by the transverse conveyor to a debris conveyor 23 where they are conveyed for removal. When the shelling is completed, the door 13 on the basket 7 is opened by an electric motor apparatus 25, while the cylinder remains rotating. The shells and hulls and other bits of material that are retained in the basket are then deposited onto the transverse conveyor 19, where they are carried upward to the debris conveyor 23. Simultaneous with the opening of the door on the basket, is the closing of a retaining door 27 mounted transversely across the transverse conveyor belt 19 which prevents the shells or hulls from rolling downwardly onto the product conveyor 21.

Figures 6, 7:
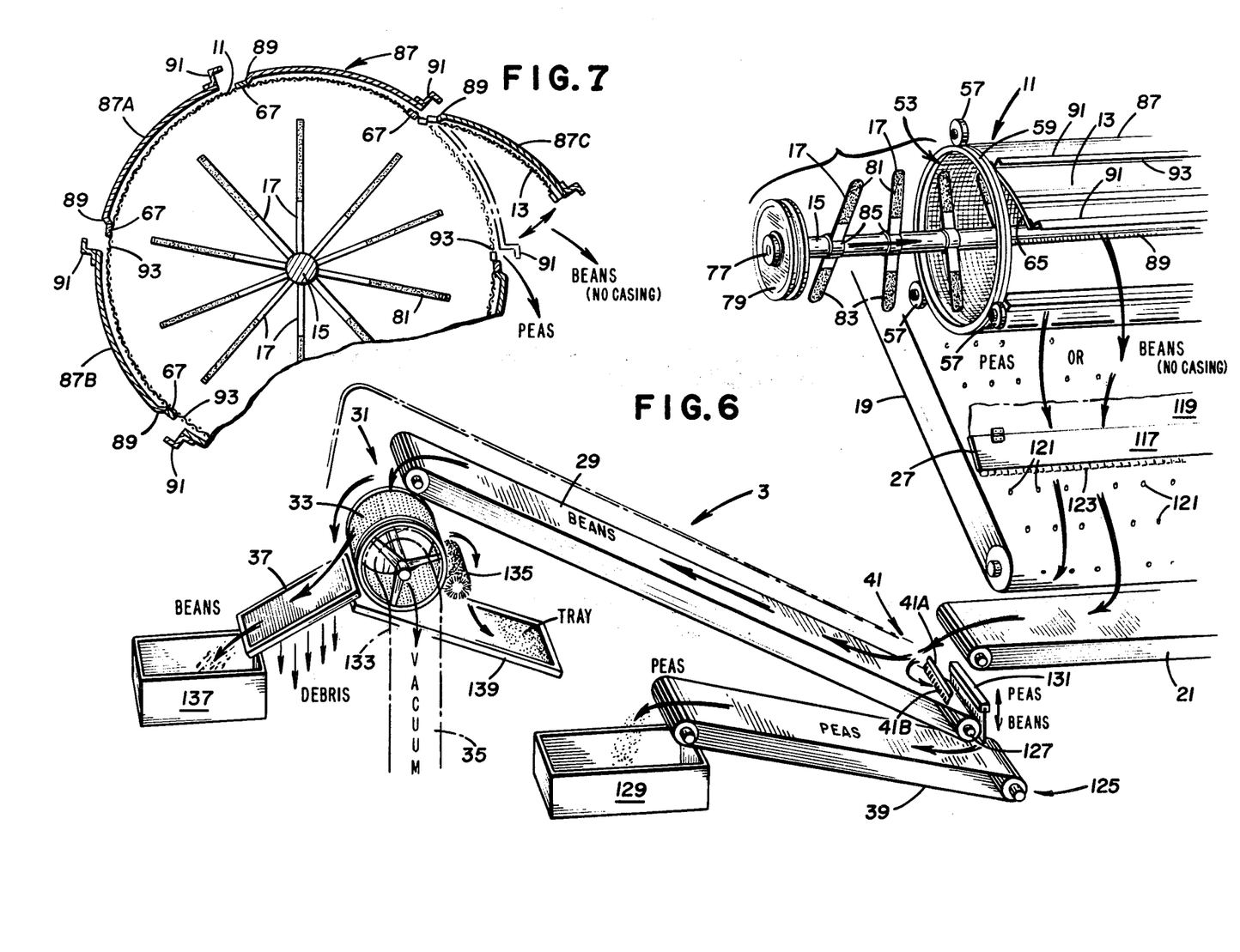
FIG. 6 is a schematic rendering of the shelling and separating apparatus.
FIG. 7 is a cross-sectional view of the basket and casing.

The separating apparatus 3 comprises a first conveyor 29 for carrying the legumes upward onto a rotating cylinder 31 having a plurality of small holes 33 on the periphery of the cylinder. A vacuum pump 35 is provided to draw air from the environment, through the holes of the cylinder, and into the interior of the cylinder. As shown in FIG. 6, crop material is dropped by the first conveyor 29 onto the rotating cylinder 31 whereby small product such as stems or bits of shells are retained on the periphery of the cylinder as it rotates by the vacuum suction of the pump 35, whereas the beans bounce off the cylinder onto a wire mesh trough 37. The wire mesh trough is designed to remove bits of shells from the beans caused by impact of the beans on the trough. A second conveyor 39 is also provided in the separating apparatus and extends upwardly at a lesser angle than the first conveyor 29. The second conveyor 39 is positioned under the first conveyor 29 and slightly rearwardly thereof. When using the apparatus to clean and separate peas, the peas fall onto the first conveyor 29 from the product conveyor 21 and move through a grating 41 onto the lower or second conveyor 39. The grating 41 serves to retain large undesirable product material on the conveyor 29 which then carries it upward toward cylinder 31 for disposal. When the first conveyor 29 is used to carry product material, the vacuum system is not used.

Details of the shelling and separating apparatus will now be described.

Figure 1:
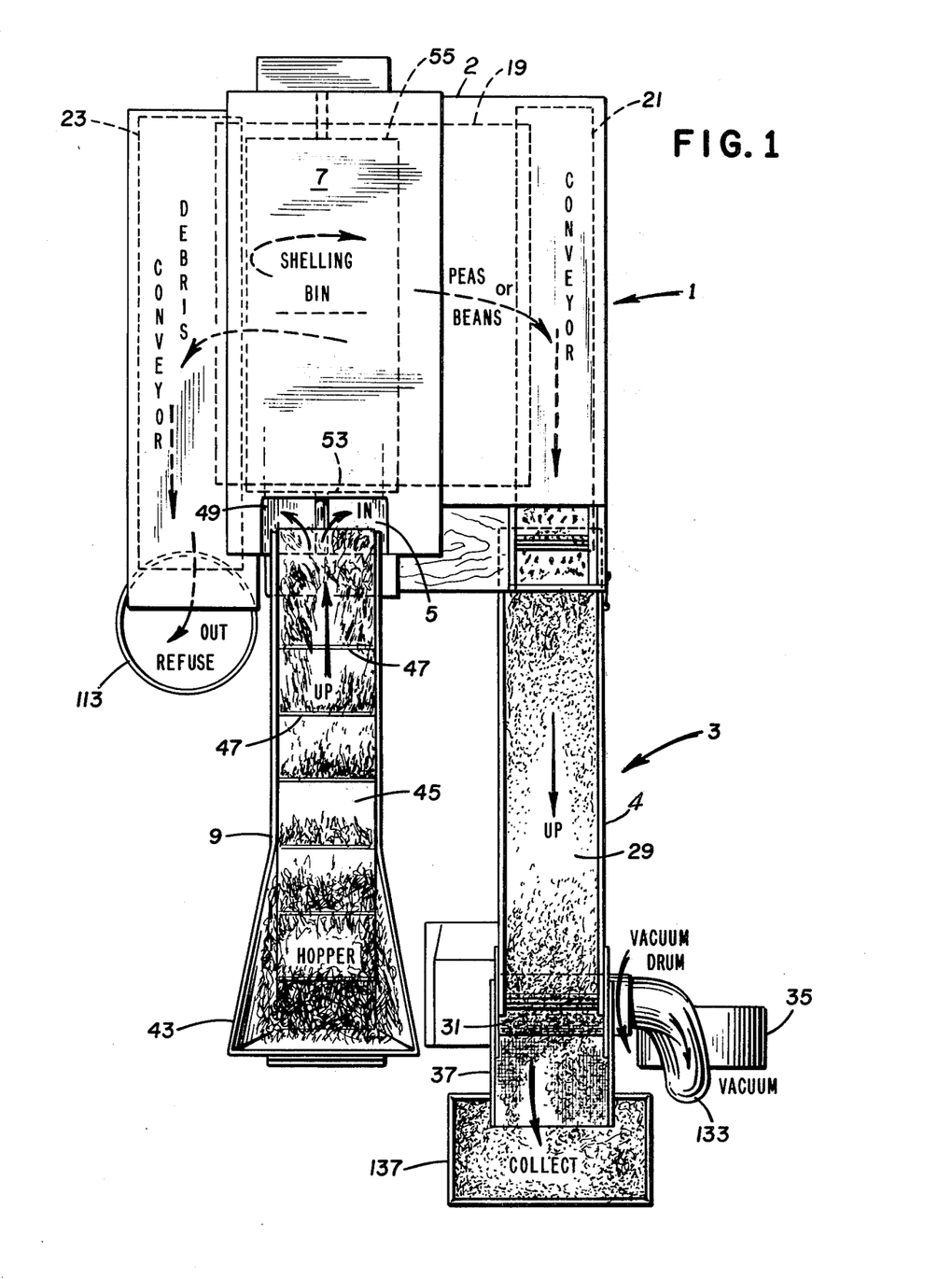
FIG. 1 shows a plan view of the entire apparatus.
Figure 2:
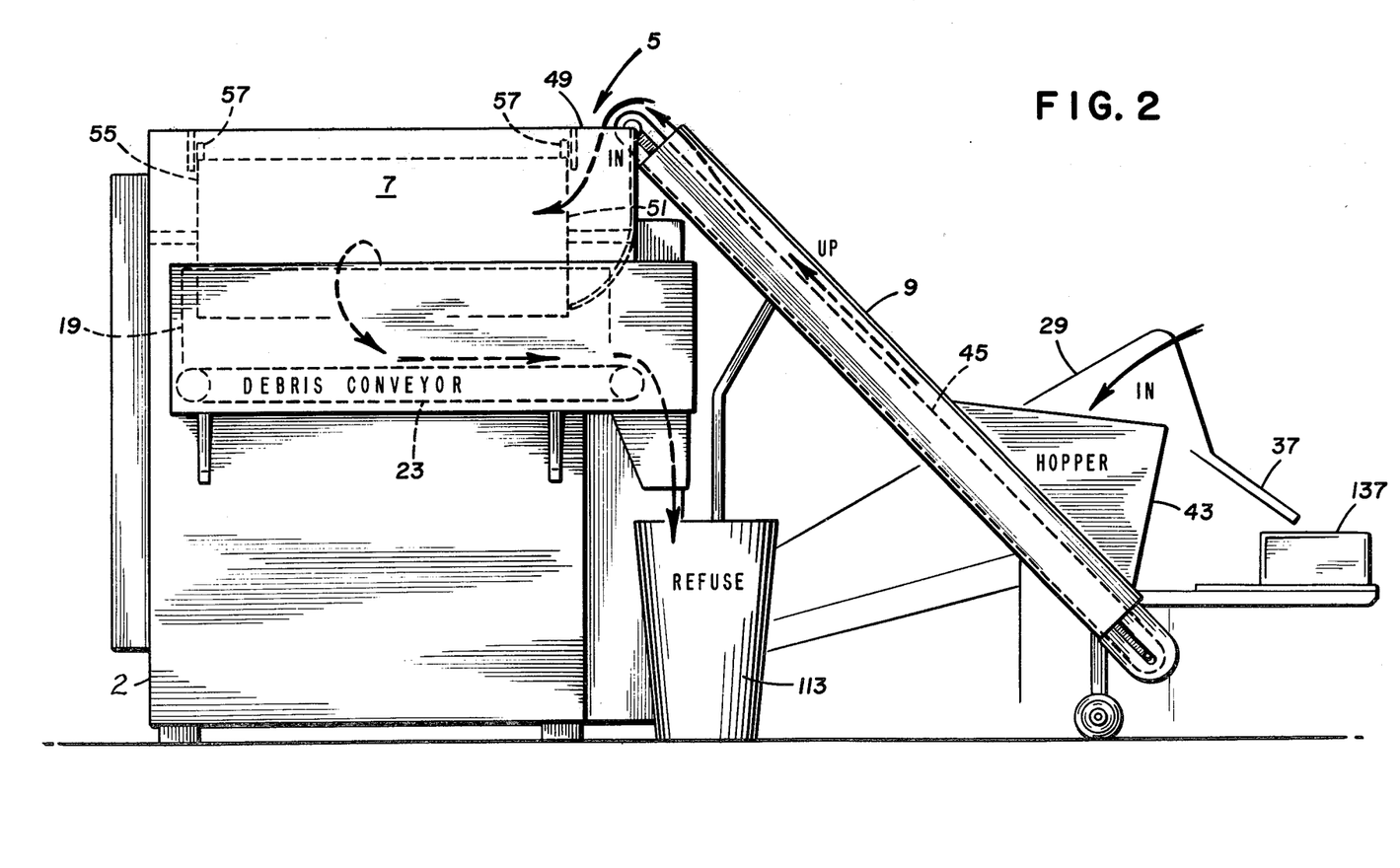
FIG. 2 shows a partial rear view of the entire apparatus.
Figure 3:
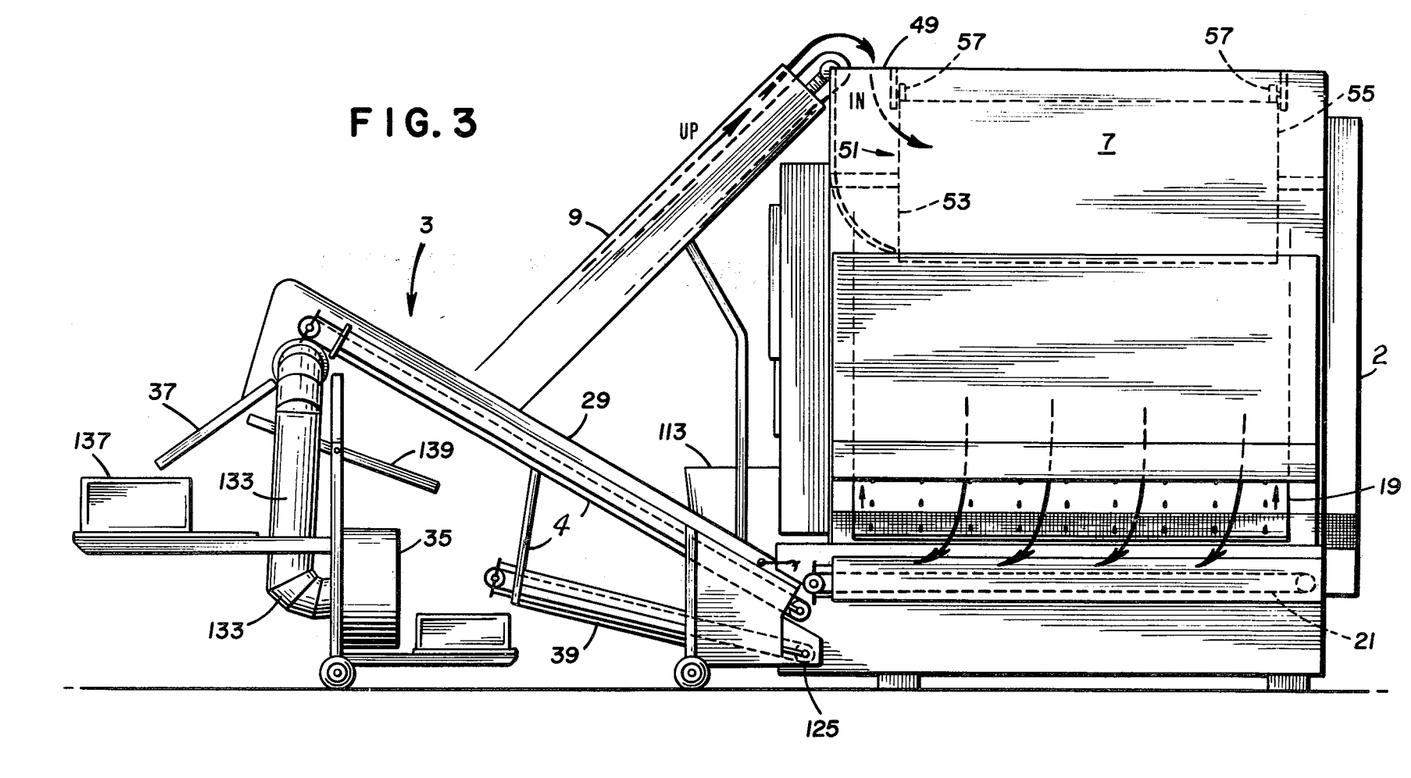
FIG. 3 shows a partial front view of the entire apparatus.
Figure 4:
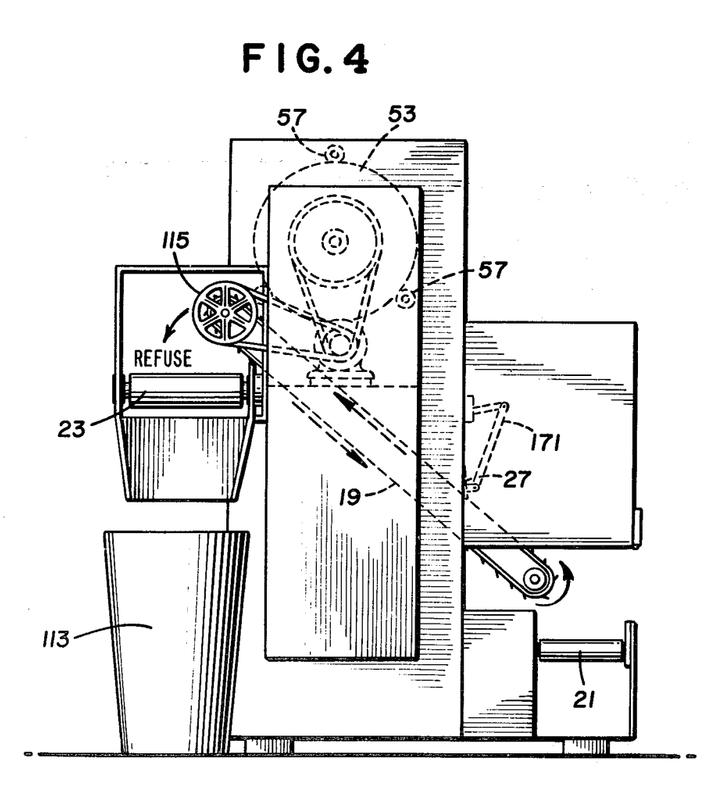
FIG. 4 shows a partial left side view of the shelling apparatus.
Figure 5:
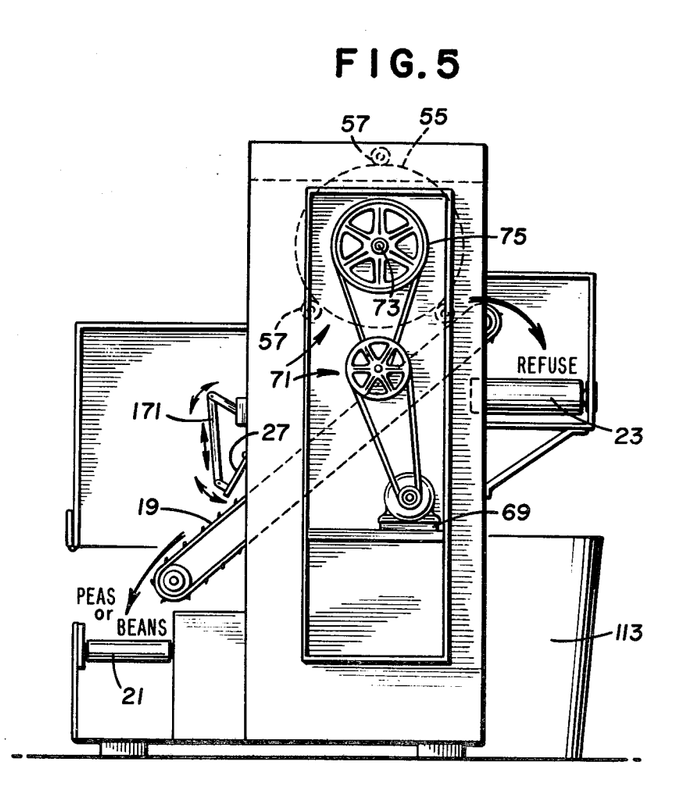
FIG. 5 shows the opposite right side view of the shelling apparatus.

Referring to FIGS. 1 and 2, a hopper conveyor 9 is shown comprising a hopper 43 and a conveyor belt 45. The legumes to be shelled are placed in the hopper and are carried upwardly, at approximately a 60° angle to a receiving chute 5, to be described below. Arranged transversely on the hopper conveyor belt are a plurality of ribs 47 which prevent the legumes from falling downwardly back into the hopper as the conveyor belt moves upward. The conveyor belt is driven by a suitable electric motor as is well-known in the art.

The receiving chute 5 has a chute inlet 49 at one end arranged to receive the legumes as they fall off of the hopper conveyor belt. The outlet end 51 of the receiving chute is in communication with an opening 53 of the shelling bin 7. Since the opening 53 of the shelling bin 7, in communication with the outlet end 51 of the receiving chute 5, is on a plane substantially perpendicular to the plane defined by the chute inlet opening 49, the chute must be curved or angled along its body from its inlet opening to its outlet opening. The legumes to be shelled move from the chute inlet opening 49 to the chute outlet opening 51 by the gravitational force exerted on the legumes as they fall off the hopper conveyor.

Figures 8, 9:
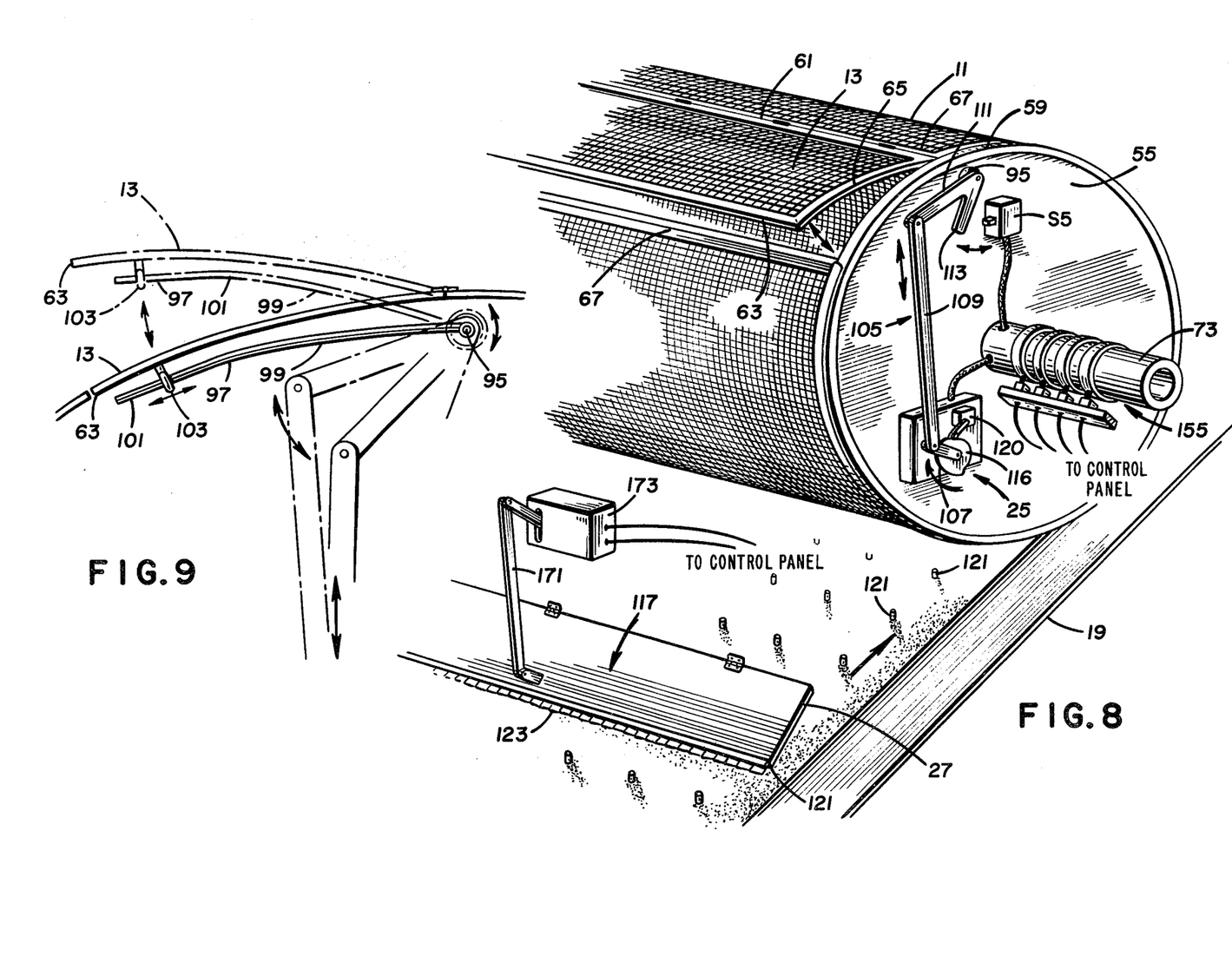
FIG. 8 is a schematic of the closed side end of the basket.
FIG. 9 is a cross-section of the basket showing the opening and closing of the basket door.

The shelling bin 7 comprises a cylindrically shaped basket 11. The cylindrically shaped basket 11 can be approximately 5½ feet long, and have a diameter of approximately 2 to 2½ feet. The basket is positioned so that its longitudinal axis is parallel to the horizontal. The basket wall is preferably cyclindrically shaped and made of ⅛ inch wire mesh, as shown in FIG. 8, so that the legumes are able to fall through, while substantially retaining the shells. The two ends of the cylindrically shaped basket are circular in cross-section. One end 53, as discussed above, is open for communication with the receiving chute 5. The other end 55 is closed. The basket is supported in a horizontal position by rubber roller wheels 57 which engage a circumferential track 59 near the two ends of the cylinder.

One wall segment of the cylindrically shaped basket is operable as a movable bin door 13. The door 13 is defined by two side edges 61 and 63 along the basket wall parallel to the longitudinal axis of the basket. The door 13 is pivotable about one side 61. The ends of the door 65 are defined by arcs of the circular cross-sectional sides of the basket. The door is arranged to open by means of suitable electric motor 25 and gear arrangements, to be described more fully below. When in a fully-opened position, the door is angled open less than 45°.

Mounted on the cylindrical wall portion of the basket are a plurality of metal supporting strips 67. The strips 67 are parallel to each other and to the longitudinal axis of the basket. The strips provide strength and support for the wire mesh basket walls, and to accommodate the lip portion of a cylindrical retaining wall, to be described below.

The basket is rotatable about its longitudinal axis by an electric motor 69 and pulley or gear arrangement 71. Extending from the closed end 55 of the basket wall in a longitudinal direction outward is a shaft 73. The shaft 73 supports a pulley wheel 75 which is driven by an electric motor 69 through suitable belts so as to rotate the basket. The basket can be rotated at different speeds, depending on the particular legume to be shelled. When looking at the basket from the closed end as shown in FIG. 8, the basket rotates in a counter-clockwise direction.

Positioned along the longitudinal axis of the cylindrically shaped basket is a beater system comprising a longitudinal rod, or shaft 15. One end of the longitudinal rod is journaled in a bearing in the closed end of the basket, not shown, for rotation with respect to the closed end of the basket. Its other end 77 extends through the open end 53 of the cylinder and through a wall of the receiving chute. There, it mounts a pulley 79 driven by a conventional electric motor and belt arrangement. Mounted on the longitudinal rod are a plurality of beaters 17. The beaters extend radially from the longitudinal rod. Each beater is angularly positioned from its adjacent beater, so that as the beater shaft is rotated, the legumes missed by one beater can be struck by an adjacent beater. The angular spacing of the beaters serves to maximize the chances of a legume being struck during rotation.

The beaters, as shown in FIG. 6, are substantially rectangularly shaped, being slightly blunted at its outer extremity 81 to avoid undue damage to the legumes. Its cross-section is substantially rectangular or oval shaped. The beaters are covered or coated with a plastic material 83, preferably Teflon, to soften the impact with the legumes. The plastic covers 83 can be replaced when worn. The beaters are shown to be attached to the longitudinal shaft by having a cylindrical portion 85 at one end adapted to fit over the longitudinal rod. Other well-known means for attaching can be provided, such as welding the beaters to the rod.

The longitudinal rod and beaters rotate at approximately 450 rpm and in the same direction as the basket. The basket however, rotates at a substantially lesser rpm, and differs depending upon whether butter beans, or peas are being hulled. When shelling butter beans, the basket rotates at 46 rpm, whereas it rotates at 30 rpm for pea shelling.

When shelling large shell legumes, such as butter beans, the butter beans in the cylinder are beaten by rotation of the beaters so that the beans are removed from their shell. The beans are of a size so that they freely pass through the ⅛ inch wire mesh and onto a transverse conveyor 19, to be described below. The shells of the butter beans are not small enough to pass through the mesh and are thus retained within the cylindrical basket during the shelling operation.

When using the shelling apparatus for shelling legumes having smaller shells, such as peas, the shells are able to pass through the ½ inch wire mesh. To overcome this problem, a cylindrical casing 87 can be placed over the cylindrical basket.

The cylindrical casing 87 is designed to be coaxially mounted by bolts or screws, not shown, to the basket. Preferably, the casing 87 will be bolted to a circumferential inner lip on the basket, not shown, however any conventional bolting means to retain the casing to the basket can be used. The casing 87 is spaced approximately ⅜ of an inch from the wire mesh wall of the basket. The casing 87 is comprised of a plurality of arcuate wall plate segments 87A, 87B, etc. One segment 87C is affixed to the door, and is movable with the door movement. Each of the segments has, along one longitudinal edge, a lip portion 89 that is angled inwardly at approximately 60°. The inner edge of the lip is designed to be fitted against the metal supporting strips 67 on the basket. The other longitudinal edge of the segments have an L-shaped member 91 extending longitudinally along the length of the segments. The mating of any two segments such that the lip edge is adjacent to the L-shaped edge results in a longitudinal slit 93. This longitudinal slit 93 provides for the peas to fall through, whereas the pea shells are substantially retained in the basket by collision with the plate segments, or the L-shaped segment should a shell happen to fall through the basket at a slit opening. Further slits, having corresponding lip portions and L-shaped portions can be provided along the wall of the plate segments.

As discussed above, the door 13 is adapted to move from a closed to an open position. A longitudinal pivot rod 95 extending parallel to the longitudinal axis of the cylindrical basket is positioned adjacent the closed end wall of the basket and near the hinge of the door. As shown in FIGS. 8 and 9, this longitudinal pivot rod 95 is adapted to rotate in a clockwise and counter-clockwise position. Affixed to the longitudinal pivot rod are lifting rods 97, only one shown in the drawings. The lifting rods 97 are attached to the pivot rod 95 and are peripendicular thereto. The lifting rod extends adjacent the cylindrical wall segment of the door and comprises two sections 99 and 101. One section 99 extends from the pivot rod to about ⅔ of the door width whereas the second section extends from the first section to a point near the opening edge 63 of the door. Mounted near the opening edge 63 of the door 13 is a ring 103. The ring is affixed to the door and extends downwardly into the basket interior along an imaginery radial line of the cylindrical basket. The end 101 of the lifting rod 97 fits into the ring 103. Thus, rotation of the longitudinal pivot rod 95 results in angular rotation of the lifting rod 97 which, situated in the ring 103 mounted to the door 13, results in opening and closing of the door. The lifting rod is adapted to slide with respect to the ring, as shown in FIG. 9.

The longitudinal pivot rod 95 is rotated by means of a connecting mechanism 105 mounted on the closed side 55 of the basket and on the outside thereof. The motive power for opening and closing the door is supplied by an electric gear motor 25, connected to rotate gear rod 107. Attached to gear rod 107 are rods 109 and 111, as shown in FIG. 8 of the drawings. The rods are of a length and are so designed such that as rod 107 moves in a circle by rotation of the gear motor, bar 111 moves in an arc. Bar 111 is fixably connected to the longitudinal rod 95, and thus results in the rod moving a certain angle in a clockwise and counter-clockwise position, thus opening and closing the door. Also mounted to bar 111 is a bar 113 which actuates an electrical switch 55. When the door is closed, the switch 55 is actuated, thus completing a circuit with a light indicator to tell the operator that the door is in a closed position. Affixed to the electric gear motor that rotates the rod 107, is an electric timing cam 116 actuating a microswitch 120. Rotation of the cam successively activates the microswitch to start and stop the electric gear motor. The electrical circuitry will be described in more detail below. It should be noted that the above-described connecting system is commonly known as a four bar mechanism. Other bar mechanisms can be designed to move the pivot rod in a given angular direction, as is well known.

Located beneath the basket 13 is a transverse conveyor belt 19 having a width at least as wide as the length of the cylindrical basket. The conveyor belt 19 is positioned to move at an angle of approximately 45° with respect to the horizontal and its direction of movement is perpendicular to the major axis of the basket in one plane, and at a 45° angle with respect to the axis in another plane. Located on the conveyor belt 19 are a plurality of knobs 121 which are preferably made of rubber. These knobs extend transversely spaced on the conveyor belt and are designed to snag shells, hulls, or other fragments that result from the beating process. The belt is driven by an electric motor and pulley arrangement, not shown, in an upward direction. During the shelling operation, the peas or beans drop down from the basket 13 onto the transverse belt 19. The beans or peas roll downward, while the transverse belt 19 is moved in an opposite upward direction. The rubber knobs 121 on the transverse belt are sufficient to retain and carry the crushed shell or hull fragments upward.

Adjacent the transverse conveyor belt 19, near the bottom of the transverse conveyor belt 19, is a product conveyor belt 21. The product conveyor belt is positioned to move parallel to the horizontal. The beans or peas roll downward from the transverse belt 19 onto the product belt 21, where they are carried to the double-belt separating conveyor system 3, to be described below. The product belt 21 is driven by an electric motor and pulley arrangement, not shown, and can be moved at two speeds, i.e., at a normal operating speed and at a rapid cleaning speed. The normal operating speed is used during normal removal operation of the hulled beans or peas. The rapid cleaning speed is used to clean off any excess dust, particles, fragments of hulls, etc., that may accumulate following repeated operation.

Mounted adjacent the transverse conveyor belt 19 at the other end of the transverse conveyor belt is a debris conveyor belt 23. This debris conveyor belt 23 is parallel to the horizontal and parallel to the product conveyor belt 21, but at a higher plane than the product conveyor belt 21. The debris conveyor belt 23 is positioned adjacent to the transverse conveyor belt 19 such that the trash, shells, or bits of shells that are to be removed are deposited from the transverse conveyor belt 19 onto the debris conveyor belt 23. The debris conveyor belt 23 transports the product to be removed in a given direction, whereby the trash is collected in a basket 113 for disposal. The trash removal conveyor belt is operated by an electric motor and pulley belt arrangement 115 in a conventional manner.

It is thus seen that the transverse conveyor belt 19 is positioned underneath the shelling basket, such that the beans or peas shelled therein are dropped onto the transverse conveyor belt 19 during the shelling operation, along with any incidental trash, or particles of shells that might fall through the basket. The beans or peas fall onto the transverse conveyor belt 19 at approximately the mid point of the transverse conveyor belt. Positioned between the point on the transverse conveyor belt where the beans or peas are deposited and the bottom of the transverse conveyor belt, is a retaining door mechanism 27. The retaining door comprising a substantially rectangularly shaped door 117, positioned adjacent the transverse conveyor belt. The door extends along the width of the transverse conveyor belt. Th door 117 is hinged to a frame 119 along its major axis, and is adapted to be movable about its hinged edge.

The other edge of the rectangularly shaped door opposite the hinged edge has associated with it a plurality of rubber or canvas strips of material 123. These strips 123 are adapted to engage the transverse conveyor belt 19 when the door 117 is in a closed, or down, position. The transverse strips 123 have slits, so that knobs on the transverse conveyor belt can pass through the rubber or canvas strips. The retaining door 117 is adapted to move from a closed position, in which the retaining door is substantially perpendicular to the horizontal, to an open position whereby the door is positioned at a certain angle so that the transverse conveyor belt 19 is not engaged by the strips 123. Linkage 171, operated by an electric motor 173, opens and closes the retaining door.

The operation of the retaining door is as follows. When the system is used in a shelling operation, the bin door 13 on the cylindrical basket 11 is in its closed position so that the beans or peas fall through the wire mesh basket 11, while the shells are retained within the basket. In this position, the retaining door 117 is adapted to remain in its open position spaced away from belt 19 to allow the beans or peas to fall freely down the transverse conveyor 19. When the shelling operation is completed, the bin door 13 is opened so that the shells can be deposited on the transverse conveyor 19 for removal. When the bin door 13 is open, the retaining door 117 is closed to keep the shells and hulls that are deposited on the transverse conveyor from moving downward by the force of gravity onto the product conveyor 21. Thus, all trash to be deposited is carried upwardly by the transverse conveyor 19 onto the debris conveyor 23. The retaining door 117 is actuated in in conjunction with the bin door 13 so that when the bin door 13 is closed, the retaining door 117 is moved away from belt 19, and when the bin door 13 is open, the retaining door 117 is moved adjacent to belt 19. The electrical circuitry for controlling this operation will be discussed below.

In operation, the beans or peas, or other legumes to be hulled, are carried upward by the hopper conveyor 45, and deposited into the receiving chute 5 where they are gravity fed into the cylindrically shaped basket 11. There, the action of the beaters 17 against the beans or peas split the beans or peas and separate the beans or peas from their hull. When shelling butter beans, or other legumes that have relatively large shells, the cylindrical casing 87 is not attached to the basket. The butter beans fall through the wire mesh of the basket and onto the transverse conveyor belt 19. The shells remain within the basket. When shelling peas or other legumes having a shell of a small diameter, such that the shells are capable of falling through the wire mesh basket, the cylindrical casing 87 is attached to the basket, whereby the casing retains the shells within the cylinder. The peas fall through the wire mesh 11 and through the slit openings 93 in the basket casing onto the transverse conveyor belt 19.

The beans or peas roll down the transverse conveyor belt 19 while the conveyor belt 19 is moving in an opposite and upward direction. It should be recognized that certain hull fragments and other debris will fall through the basket onto the transverse conveyor belt 19. The knobs 121 on the transverse conveyor belt 19 will retain and catch a high percentage of the fragments and carry them outwardly and upwardly for deposit onto the debris conveyor belt 23. The beans or peas roll down onto the product removal conveyor belt 21, where they are removed to the double belt separating conveyor system 3, to be described below.

During this operation, the door 13 of the cylinder 11 is maintained in a closed position. The retaining door 117 positioned adjacent the transverse conveyor belt 19 is in an open position so that the beans or peas are not impeded as they drop onto the transverse conveyor belt 19 and roll downwardly onto the product removal conveyor belt 21. The operation of the door 13 of the basket 11 is in conjunction with the door 117 adjacent the transverse conveyor belt 19. That is, electrical circuitry is provided, to be discussed below, such that when the basket door 13 is closed, the retaining door 117 is open, and vice versa.

When the beans or peas are completely hulled, which the operator can determine by observing the output of the product removal conveyor belt 21, the door 13 of the basket 11 is opened and the transverse retaining door 117 is closed in conjunction therewith. During this door opening operation, the basket 11 maintains its rotational movement. The hulls that are retained in the basket are now automatically deposited onto the transverse conveyor belt 19 and are moved upwardly and outwardly onto the debris conveyor belt 23. The simultaneous closing of the retaining door 117 prevents the shells or hulls from being deposited on the product removal conveyor belt 21.

Referring now to the double belt conveyor and separating system 3, the system comprises a pair of belt conveyors as shown in FIG. 6. A first conveyor 29 is disposed at an angle relative to the horizontal of approximately 30°. A second conveyor 39 has one end 125 positioned adjacent to one end 127 of the first conveyor, but at a position slightly rearward of the first conveyor belt. The second conveyor belt 39 is disposed at an angle of approximately 15° from the horizontal. The second conveyor 39 is positioned directly under the first conveyor 29. The second conveyor 39 is designed to carry product, such as peas, from its bottom end 125 upwardly into a conventional basket 129 positioned adjacent its top end.

Adjacent the first conveyor belt 29 near its bottom end 127, is a grating 41 comprising a bar 41A extending transversely across the belt 29 from which a grate extends having slits 41B. A retaining member 131 can be manually positioned adjacent the slits to block the slits in a manner to be described. It should be remarked that in FIG. 6 of the drawings, the retaining member 131 is depicted spaced slightly downstream of the grating 41.

This is solely for purposes of clarity. In fact, the grating 41 and retaining member 131 are positioned adjacent to each other, as described above. As should be obvious, the grating 41 and retaining member 131 can be supported from any convenient fixed member.

Positioned at the upper end of the first conveyor is a rotary vacuum separating system. The system comprises a cylinder 31 mounted transversely of the first conveyor belt 29 and positioned slightly below the first conveyor belt 29. The cylinder 31 is approximately 1 foot in diameter and its cylindrical wall includes a number of small holes 33 therein. The holes are sized such that neither beans or other legumes, nor small waste particles to be separated, can fall through. The cylinder is rotated by a conventional electric motor, not shown. Positioned within the interior of the cylinder 31 is a duct 133 that extends downward to a vacuum pump 35. The vacuum pump 35 is adapted to draw air through the duct and from the outside of the cylinder through the small holes on the cylinder wall. The capacity of the pump is such that heavier objects, such as beans are not retained on the cylinder wall, whereas lighter objects such as stems, can be so retained.

Mounted adjacent to, and rearwardly of, the cylinder 31 is a rotatable brush 135. The brush 135 is cylindrically shaped and positioned so as to be in contact with the cylinder wall 31. The brush has a longitudinal axis which is journalled at each end, not shown, for rotation. The brush 135 is rotated by the rotation of the cylinder 31, which contacts the brush.

Positioned adjacent to the rotating cylinder, and forwardly of the rotating cylinder, is a wire mesh trough 37 having a mesh size of ¼ inch. The wire mesh trough angles downwardly from the rotating cylinder. At the bottom of the wire mesh trough is a container 137 for collecting the beans or other legumes.

The double belt conveyor system operates as follows. When using the device to clean peas, i.e., to separate the stems and other small particles from the peas, the retaining member 131 is removed from the grating, thus allowing the grating slits to remain open. The conveyor 29 is positioned adjacent to and underneath the product removing conveyor 21 so that the peas drop directly onto the first conveyor belt 29 at a point above the grating. The peas then roll downwardly through the graging 41 and onto the second conveyor belt. The peas are carried by the second conveyor belt 39 at a 15° angle into a collecting container 129. Should any fragments of hulls remain in the peas, the grating 41 serves to retain the larger fragments from falling onto the second conveyor belt 39. These fragments are carried upwardly by the second conveyor belt where they are collected and then discharged. The vacuum pump system 31 is not used for this operation.

When using the double belt conveyor system for larger legumes, such as butter beans, the retaining member 131 is inserted to block off the slits 41B of the grating 41. The belt conveyor 29 is then positioned adjacent to and slightly underneath the product removing conveyor 21 and the beans are dropped directly onto the first conveyor and carried upwardly at a 30° angle along with any fragments of shells that remain. The retaining member 131 prevents any bean or hull fragments from falling onto the second conveyor 39. The second conveyor 39 is thus not used when separating butter beans. The butter beans and hull fragments are then carried upwardly by the first conveyor 29 and dropped at the other end of the first conveyor onto the rotating cylinder 31. The beans, along with the hull fragments, are dropped onto the rotating cylinder 31. The beans having a heavier weight than the hull fragments, are bounced off of the rotating cylinder 31 and fall directly onto the wire mesh trough 37. Smaller scrap fragments are retained onto the surface of the cylinder 31 by the suction of the vacuum pump 35. These fragments remain on the periphery of the cylinder until they are contacted by the rotatable brush 135, which brushes the fragments off of the cylinder onto a 139 for removal of the fragments. The beans, meanwhile, have dropped onto the wire mesh trough 37, and any stems or other small particles that manage to remain are shaken by the impact of the fall onto the wire mesh and fall through the wire mesh. The beans roll down the wire mesh trough and into a container 137 where they are collected.

Figure 10:
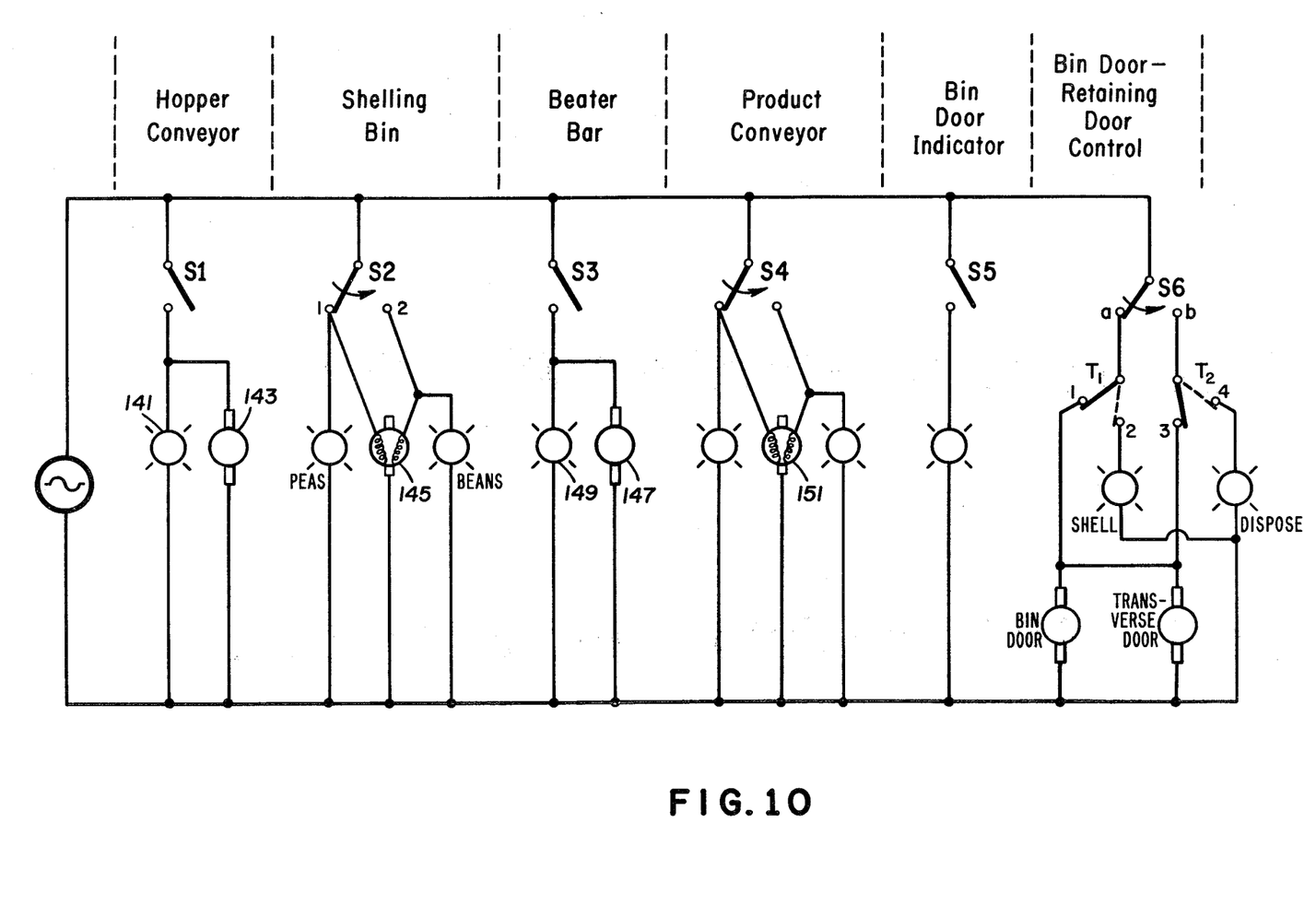
FIG. 10 is a schematic of the electrical circuitry used to operate the apparatus.

Referring now to the electrical circuitry that operates the shelling apparatus, FIG. 10 shows a schematic circuit diagram indicating the electrical operation of the apparatus. Switch S1 when actuated by an operator provides electrical AC power to a parallel combination of an indicator light 141 and a motor 143 for operating the hopper conveyor 45. While not shown in the drawings, it should be appreciated that a similar circuit can be provided for the transverse conveyor 19 and the debris conveyor 23. Switch S2 is a two-way switch that, in one position actuates the shelling bin motor 145 at a speed for shelling peas, and in a second position actuates the shelling bin motor for shelling beans. The shelling bin motor operates at two speeds. Indicator lights are shown. The beater bar system is a parallel combination of a beater bar motor 147 and an indicator light 149 actuated by switch S3. The product conveyor, which removes the beans or peas, is actuated by Switch S4, which is a two-way switch which, in one position operates the product conveyor motor 151 in its normal operation, i.e., for removing the beans or peas to the separating conveyor system and, in its second position operates at a higher speed for removing loose particles from the conveyor that may have accumulated. A bin door indicator is shown as a light connected in series with a switch S5. The switch S5 is located on the linkage at the closed end of the basket and is actuated when the basket is in its closed position. This will indicate to the operator that the bin door is closed. Switch S6 actuates a control for the bin door 13 and a retaining door 117 control mechanism. Connected in series with switch S6 is a timing cam 116 having two timing periods indicated schematically as T1 and T2. When switch S6 is at a position a, the bin door and transverse door motors are actuated to rotate the bin door and transverse door in a given direction. That is, assuming the bin door is in its open position and the transverse door is in its closed position, during the time period T1, the bin door closes and the transverse door opens. At the end of time period T1, the "Shell" light is on which indicates that the bin door is closed and the transverse door is open so that shelling can occur. This is shown schematically when the switch T1 is at position 2. When the switch S6 is at position b, the bin door and transverse door are moved from their closed and open positions respectively, to a position where the bin door is open and the transverse door is closed. At the end of this time cycle T2, the "Dispose" light is on to indicate that the shells and hulls are ready for disposal. It should be apparent to those of ordinary skill in the art that numerous modifications to the circuitry can be provided that would perform the operation of this system.

The various switches S1–S6, and indicator lights, are mounted in a control panel conveniently located. Electrical power is supplied to the timing motor and cam arrangement by an electrical brush and ring assembly 155 on the shaft 73.

The figures described herein represent a preferred embodiment of the apparatus, however, other embodiments and numerous modifications are well within the scope of the present invention. These other embodiments and modifications will be apparent to those of ordinary skill in the art.

I claim:

1. A shelling apparatus for shelling beans, peas, or other legumes, comprising,
   (a) a support frame,
   (b) receiving chute supported by said support frame for receiving the legumes to be shelled,
   (c) a shelling bin means supported by said support frame for shelling the legumes comprising a wire mesh basket having a cylindrically shaped wire mesh wall having a closed end and an open end, said open end adapted to receive the legumes to be shelled from said receiving chute, one wall segment of said cylindrically shaped wall comprises a bin door, having a length substantially equal to the length of said basket and hinged on one edge to the wall of said cylinder, said hinge line parallel to the major axis of said basket, means for supporting said basket such that the major axis of said basket is horizontal, motor means for rotating said basket about its major axis, beater shaft means comprising a longitudinal shaft positioned along the major axis of said basket, one end being rotatably connected to the closed end of said basket, the other end extending through the open end of said basket and through said receiving chute means, a plurality of beaters extending radially from said longitudinal shaft along the length thereof, shaft rotation means supported by said support frame and interconnected with said other end of said longitudinal shaft for rotating said shaft and beaters about the longitudinal axis of said shaft in the same direction as the rotation of said basket, and at a velocity greater than the rotation velocity of said basket, wherein rotational movement of said beaters removes the legumes from their shell whereby said legumes fall through the wire mesh basket, and said shells remain inside the wire mesh basket, pivot means operatively associated with said basket for pivoting said bin door in a closed position during a shelling operation, and in an open position during a trash removal operation,
   (d) transverse conveyor means supported by said support frame comprising an inclined conveyor belt having an upper end and a lower end positioned below said shelling bin means having a width substantially equal to the length of said basket and comprising a plurality of knob means on said belt, and a transverse conveyor drive means for driving said transverse conveyor belt,
   (e) product conveyor means supported by said support frame for conveying the shelled beans comprising a product conveyor belt positioned adjacent said lower end of the transverse inclined conveyor belt for movement in a direction substantially perpendicular to the movement of said transverse conveyor,
   (f) debris conveyor means supported by said support frame comprising a debris removal conveyor belt positioned adjacent said upper end of said transverse inclined conveyor belt for movement in a direction substantially perpendicular to the movement of said transverse inclined conveyor belt.

2. The shelling apparatus of claim 1 wherein said beaters are plastic coated.

3. The shelling apparatus claimed in claim 1, further comprising a hopper conveyor for conveying legumes to said receiving chute means.

4. The shelling apparatus of claim 1 further comprising a cylindrical casing concentrically disposed about and connected to said wire mesh basket and having a diameter slightly larger than the diameter of the basket to define a space therebetween, said cylindrical casing having circumferentially spaced longitudinal slits therethrough that are parallel to the major axis of the basket, whereby said spacing and said slits provide for the legumes to drop from the interior of the basket into the space between the basket wall and the casing and out through said longitudinal slits, whereas the shells of the legumes are retained in the basket.

5. The shelling apparatus of claim 4 wherein the cylindrical casing is removably mounted on said basket.

6. The shelling apparatus of claim 5 wherein said cylindrical casing comprises a plurality of segments, one of said segments mounted on the bin door of the basket, and movable with the bin door.

7. The shelling apparatus of claim 1 further comprising a retaining door positioned adjacent said transverse conveyor, wherein said pivot means pivots said retaining door in a closed position in contact with the transverse conveyor means and simultaneously pivots said bin door to an open position.

8. A separating apparatus for separating small, light products, such as stems and bits of shells, from larger, heavier products, such as peas, beans or other legumes, comprising:
   (a) a support frame;
   (b) an inclined first conveyor belt supported by said support frame for carrying the product to be separated and having a lower end and an upper end;
   (c) a separating drum supported by said support frame having a cylindrical shape and positioned adjacent and below said upper end of said first conveyor belt such that the product to be cleaned falls on the cylindrically-shaped wall of said separating drum, said drum having a plurality of holes on said cylindrically-shaped wall, said holes having a size such that both the small and large products do not fall through, and means for rotating said drum about its axis;
   (d) vacuum pump means supported by said support frame for drawing air through the small holes into the interior of said drum, said pump means having a pump capacity sufficient to retain the small, light products on the periphery of said drum as it rotates, but insufficient to retain the larger, heavier product on the periphery of said drum;
   (e) brush means rotatably mounted on said support frame adjacent said separating drum, comprising a brush in contact with said drum, and rotatable by the rotational movement of said drum for brushing the retained product from said drum;

(f) trough means comprising a wire mesh trough supported by said support means positioned slightly below said separating drum for receiving said large product and any small product that remains, from said drum, whereby said wire mesh is of a size such that small product can fall through but larger product cannot fall through, whereby said larger product rolls down said trough for collection;

(g) an inclined second conveyor belt supported by said support frame and having a lower end and an upper end and positioned under said first conveyor belt for moving product, said lower end of said second conveyor belt spaced slightly rearwardly of said lower end of said first conveyor belt, said upper end of said second conveyor belt positioned at a lower elevation than said upper end of said first conveyor belt;

(h) grating means mounted on said support frame adjacent said first conveyor belt and spaced from the lower end of said first conveyor belt along said first conveyor belt, said grating means comprising a grate disposed transversely across said first conveyor belt, said grate having openings sufficient to let small legumes roll therethrough but insufficient to let larger objects, such as shells, roll therethrough, whereby said small legumes move through the grate and onto said second conveyor belt, and whereby the larger objects retained on said first conveyor belt move along said first conveyor belt to the upper end of said first conveyor belt for disposal.

9. The separating apparatus of claim 8 wherein said first conveyor belt is at an angle of approximately 30° with respect to the horizontal, and said second conveyor belt is at an angle of approximately 15° with respect to the horizontal.

10. A shelling apparatus for shelling beans, peas or other legumes, comprising, (a) a first support frame, (b) a receiving chute supported by said first support frame for receiving the legumes to be shelled, (c) a shelling bin means supported by said first support frame for shelling the legumes comprising a wire mesh basket having a cylindrically-shaped wire mesh wall having a closed end and an open end, said open end adapted to receive the legumes to be shelled from said receiving chute, one wall segment of said cylindrically-shaped wall comprises a bin door, having a length substantially equal to the length of said basket and hinged on one edge to the wall of said cylinder, said hinge line parallel to the major axis of said basket, means for supporting said basket such that the major axis of said basket is horizontal, motor means for rotating said basket about its major axis, beater shaft means comprising a longitudinal shaft positioned along the major axis of said basket, one end being rotatably connected to the closed end of said basket, the other end extending through the open end of said basket and through said receiving chute means, a plurality of beaters extending radially from said longitudinal shaft along the length thereof, shaft rotation means supported by said first support frame and interconnected with said other end of said longitudinal shaft for rotating said shaft and beaters about the longitudinal axis of said shaft in the same direction as the rotation of said basket, and at a velocity greater than the rotation velocity of said basket, wherein rotational movement of said beaters removes the legumes from their shell whereby said legumes fall through the wire mesh basket, and said shells remain inside the wire mesh basket, pivot means operatively associated with said basket for pivoting said bin door in a closed position during a shelling operation, and in an open position during a trash removal operation, (d) transverse conveyor means supported by said first support frame comprising an inclined conveyor belt having an upper end and a lower end positioned below said shelling bin means having a width substantially equal to the length of said basket and comprising a plurality of knob means on said belt, and a transverse conveyor drive means for driving said transverse conveyor belt, (e) product conveyor means supported by said first support frame for conveying the shelled beans to a separating conveyor means comprising a product conveyor belt positioned adjacent said lower end of said transverse inclined conveyor belt for movement in a direction substantially perpendicular to the movement of said transverse conveyor, (f) debris conveyor means supported by said first support frame comprising a debris removal conveyor belt positioned adjacent said upper end of said transverse inclined conveyor belt for movement in a direction substantially perpendicular to the movement of said transverse inclined conveyor belt.

(g) a second support frame, (h) an inclined first separating conveyor belt supported by said second support frame positioned adjacent said product conveyor means for carrying the product to be separated and having a lower end and an upper end, (i) a separating drum supported by said second support frame having a cylindrical shape and positioned adjacent and below said upper end of said separating conveyor belt such that the product to be cleaned falls on the cylindrically-shaped wall of said separating drum, said drum having a plurality of holes on said cylindrically-shaped wall, said holes having a size such that both the small and large products do not fall through, and means for rotating said drum about its axis, (j) vacuum pump means supported by said second support frame for drawing air through the small holes into the interior of said drum, said pump means having a pump capacity sufficient to retain the small, light products on the periphery of said drum as it rotates, but insufficient to retain the larger, heavier product on the periphery of said drum, (k) brush means rotatably mounted on said second support frame adjacent said separating drum, comprising a brush in contact with said drum, and rotatable by the rotational movement of said drum for brushing the retained product from said drum, (l) trough means comprising a wire mesh trough supported by said second support frame positioned slightly below said separating drum for receiving said large product and any small product that remains, from said drum, whereby said wire mesh is of a size such that small product can fall through but larger product cannot fall through, whereby said larger product rolls down said trough for collection.

11. The shelling apparatus of claim 10 further comprising an inclined second separating conveyor belt supported by said second support frame and having an upper end and a lower end, and positioned under said first separating conveyor belt for moving product, said lower end of said second separating conveyor belt spaced slightly rearwardly of said lower end of said first separating conveyor belt, said upper end of said second separating conveyor belt positioned at a lower elevation than said upper end of said first separating conveyor belt, grating means mounted on said second support frame adjacent said first separating conveyor belt, and spaced from the lower end of said first separating conveyor belt along said first separating conveyor belt, said grating means comprising a grate disposed transversely across said first separating conveyor belt, said grate having openings sufficient to let small legumes roll therethrough, but insufficient to let larger objects, such as shells, roll therethrough, whereby said small legumes move through the grate and onto said second separating conveyor belt, and whereby the larger objects retained on said first separating conveyor belt move along said first separating conveyor belt to the upper end of said first separating conveyor belt for disposal.

* * * * *